United States Patent
Olivier

(10) Patent No.: US 9,371,216 B2
(45) Date of Patent: Jun. 21, 2016

(54) PIPELINE PIG EXTRACTOR AND TRANSPORT APPARATUS WITH WIND GUARD

(75) Inventor: Pierre L. Olivier, Houma, LA (US)

(73) Assignee: INTEGRIS RENTALS, L.L.C., Houma, LA (US)

( * ) Notice: Subject to any disclaimer, the term of this patent is extended or adjusted under 35 U.S.C. 154(b) by 1256 days.

(21) Appl. No.: 13/121,154

(22) PCT Filed: Sep. 25, 2009

(86) PCT No.: PCT/US2009/058437
§ 371 (c)(1),
(2), (4) Date: Mar. 25, 2011

(87) PCT Pub. No.: WO2010/036932
PCT Pub. Date: Apr. 1, 2010

(65) Prior Publication Data
US 2011/0174387 A1 Jul. 21, 2011

Related U.S. Application Data

(60) Provisional application No. 61/100,633, filed on Sep. 26, 2008, provisional application No. 61/101,530, filed on Sep. 30, 2008.

(51) Int. Cl.
*H01L 21/677* (2006.01)
*B66F 7/08* (2006.01)
*B66F 7/06* (2006.01)

(52) U.S. Cl.
CPC . *B66F 7/08* (2013.01); *B66F 7/065* (2013.01); *B66F 7/0625* (2013.01); *Y10T 137/0435* (2015.04)

(58) Field of Classification Search
USPC .................. 414/589, 609, 610, 591; 254/227
See application file for complete search history.

(56) References Cited

U.S. PATENT DOCUMENTS

| | | | |
|---|---|---|---|
| 2,822,931 | A | 2/1958 | Sparrow |
| 4,582,551 | A | 4/1986 | Parkes et al. |
| 4,643,855 | A | 2/1987 | Parkes et al. |
| 5,044,827 | A | 9/1991 | Gray et al. |
| 5,178,429 | A | 1/1993 | Gray et al. |
| 5,522,582 | A * | 6/1996 | Dilks ............................ 254/323 |
| 5,769,955 | A | 6/1998 | Kozisek |
| 6,234,717 | B1 | 5/2001 | Corbetta |

(Continued)

FOREIGN PATENT DOCUMENTS

GB 2196715 5/1988

*Primary Examiner* — Saul Rodriguez
*Assistant Examiner* — Willie Berry, Jr.
(74) *Attorney, Agent, or Firm* — Garvey, Smith, Nehrbass & North, L.L.C.

(57) ABSTRACT

A method and apparatus for transporting a pipeline pig provides a housing having an interior. A jacking mechanism is contained within the housing interior. A carriage is supported by the jacking mechanism for movement between an upper extended and a lower retracted position. The carriage has a concave surface that generally cradles a pipeline pig to be transported. A pulling device on the housing enables a pipeline pig to be pulled from a location that is not on the carriage to a position that is on the carriage. The position that is not on the carriage can be for example a pig trap. As part of the method of the present invention, the pulling device pulls the pig from the pig trap or other location to the carriage and then the carriage is retracted into the housing for transport to a remote location.

14 Claims, 9 Drawing Sheets

(56) References Cited

U.S. PATENT DOCUMENTS

| | | |
|---|---|---|
| 6,503,021 B2 | 1/2003 | Corbetta |
| 6,767,165 B1 | 7/2004 | Corbetta |
| 6,925,671 B1 | 8/2005 | Mouton |
| 7,588,644 B1 | 9/2009 | Olivier |
| 2001/0010782 A1 | 8/2001 | Corbetta |
| 2003/0026662 A1 | 2/2003 | Vidal et al. |
| 2004/0062630 A1* | 4/2004 | Marrero ................ 414/589 |
| 2006/0042033 A1 | 3/2006 | Filippovitch et al. |
| 2006/0048814 A1 | 3/2006 | Albrecht et al. |
| 2007/0045205 A1 | 3/2007 | Olivier |
| 2007/0177944 A1 | 8/2007 | Smith et al. |
| 2007/0214590 A1 | 9/2007 | Boe et al. |
| 2009/0152520 A1* | 6/2009 | Hepburn ................ 254/227 |

* cited by examiner

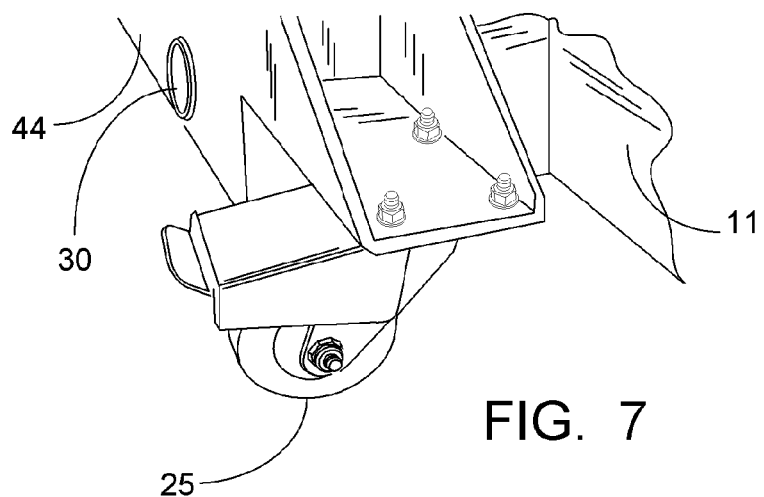
FIG. 7
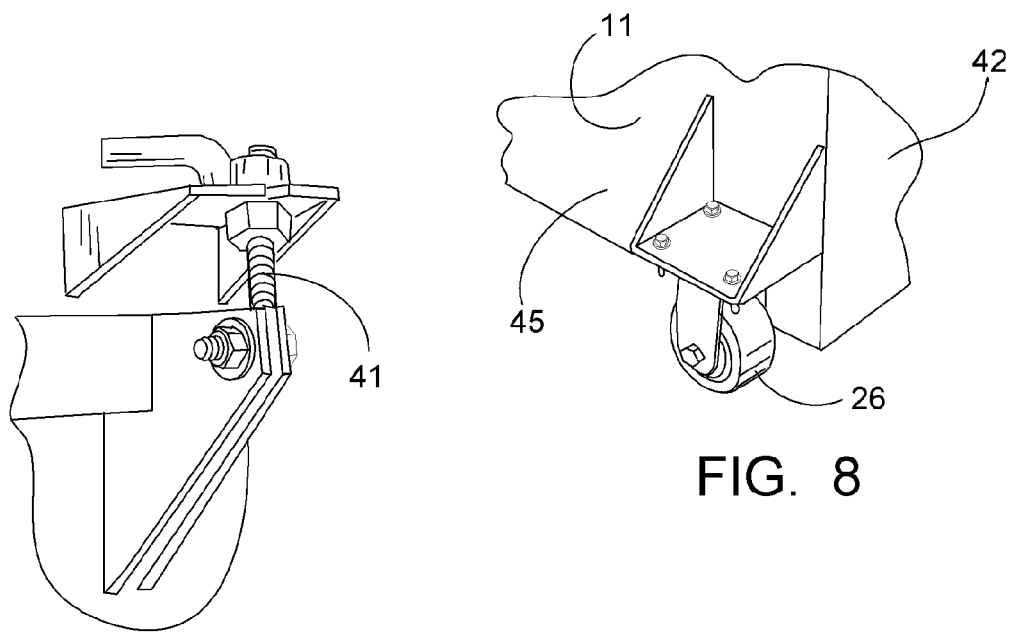
FIG. 8
FIG. 9

PIPELINE PIG EXTRACTOR AND TRANSPORT APPARATUS WITH WIND GUARD

CROSS-REFERENCE TO RELATED APPLICATIONS

My U.S. Provisional Patent Application No. 61/100,633, filed 26 Sep. 2008, is incorporated herein by reference. My U.S. Provisional Patent Application No. 61/101,530, filed 30 Sep. 2008, is incorporated herein by reference. Priority of both of these applications is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to pipeline pigs and more particularly to a method and apparatus for transporting pipeline pigs, such as after they have been used to clean or scrape a section of pipeline. More particularly, the present invention relates to an improved pipeline pig transport method and apparatus that employs a housing having a specially shaped carriage that can be moved with a jack or jacking mechanism or elevator between collapsed and extended positions, the housing enabling transport of the contaminated pig after it has been removed and is covered with contaminants such as wax, oil, debris, dirt or the like.

2. General Background of the Invention

Pipeline pigs are often employed to clean a section of pipeline. A discussion of pipeline pigs can be found at www-.ppsa-online.com/about-pigs.php.

Pig traps are used for inserting pigs into or removing pigs from a pipeline. The pig trap can be used for launching a pig or for removing a pig and without interruption of flow.

One of the inventor's customers invited him to look at a very crude device that was being used to assist the customer with pulling out pigs from pipelines that basically could only roll to the door of the pipe and then back away so the workers could close the door. This unit's feature was basically a trough with a hand winch which the operator cranked to pull the pig out. The liquids fell below in a container that was built in or part of the unit. After water was drained in the trough on site or overboard and liquids or oil were pumped out for proper disposal. The surface of the unit was basically grating that was bent to a concaved fashion to receive the pig. This unit was not portable for highway transport and also had no lid for protection of the pig nor did it have wind guards to prevent oils or residue from going into the environment. This unit did not retract the pig within itself and also was felt to be of great possible injury to the operator when removing the pig by cranking (as there was a risk of cable failure, which could injure the operator).

Patents have issued that relate to pipeline pigs and methods of handling them. Examples are in the following table. All references mentioned herein are incorporated herein by reference.

TABLE

| U.S. Pat. No./ Publication No. | Title | Publication Date MM-DD-YYYY |
|---|---|---|
| 2,822,931 | Device for Loading Bombs and The Like | 02-11-1958 |
| 4,582,551 | Sealing Joints and Leaks with an Anaerobic Liquid | 04-15-1986 |
| 4,643,855 | Sealing Joints and Leaks | 02-17-1987 |
| GB2196715 | Method Of Launching A Pig Into A Pipeline | 05-05-1988 |
| 5,044,827 | Method for Recovering Wet Buckled Pipe | 09-03-1991 |
| 5,178,429 | Pipeline Recovery Head | 01-12-1993 |
| 5,769,955 | Portable System for Launching/Catching Pipeline Pigs | 06-23-1998 |
| 6,234,717 | Method and Apparatus for Connecting Underwater Conduits | 05-22-2001 |
| 2001/0010782 | Method and Apparatus for Connecting Underwater Conduits | 08-02-2001 |
| 6,503,021 | Method and Apparatus for Connecting Underwater Conduits | 01-07-2003 |
| 2003/0026662 | Cable Installation | 02-06-2003 |
| 2004/0062630 | System and Methods for Handling Aircraft munitions | 04-01-2004 |
| 6,767,165 | Method and Apparatus for Connecting Underwater Conduits | 07-27-2004 |
| 6,925,671 | Pig Launcher | 08-09-2005 |
| 2007/0177944 | Apparatus and Method for Laying Down, Abandoning, and Recovering a Pipe on the Sea Floor | 08-02-2007 |
| 2009/0152520 | Pig Extracting Device | 06-18-2009 |

See also my United States Patent Application published Mar. 1, 2007 as US 2007/0045205 for Pipeline Pig Storage Rack Apparatus and my U.S. Pat. No. 7,588,644 issued Sep. 15, 2009 for Method and apparatus for cleaning pipeline pigs.

BRIEF SUMMARY OF THE INVENTION

The present invention provides an improved method and apparatus for transporting a pipeline pig.

An embodiment of the present invention promotes operator safety by using a remote tether for control which allows the operator to be out of possible harm's way. The present invention preferably has air operated controls that lift up or lower the pig as well as a built-in pan with a lid that assures safe highway transport or vessel without spillage and also can be used for storage purposes. The present invention preferably has wind guards for spill prevention as well as fork slots for moving around at bases of operation safely and a four-part sling system for crane or overhead movement. The present invention preferably has three basic compartments with drain plugs to remove liquids. The present invention preferably can be changed to handle larger or longer pigs by using multiple scissor lifts in unison to lift or lower longer style smart pigs or traditional longer connected pigs. The lid system of the present invention would also be an advantage for storage.

The transport apparatus employs a housing having an interior. A jack or jacking mechanism or lifting mechanism or elevator is contained within the housing interior. A carriage is supported by the jacking mechanism for movement between extended and retracted positions.

In a preferred embodiment, the carriage provides a concave surface enabling the pipeline pig to be cradled during removal, insertion and/or transport.

A pulling device (which can include a winch and winch cable, for example) is preferably provided on the housing. The pulling device is preferably positioned to pull a pipeline pig to the carriage when the carriage is in the extended position. Pulling devices other than winches can include chain hoists, come-a-longs, or manual tugging.

The present invention includes a method of transferring a pipeline pig to or from a pig trap to or from a remote location spaced away from the pig trap. The method includes the providing of a housing having an interior that contains an elevating or jacking mechanism that moves a carriage between extended and retracted positions.

The housing is transported to a position next to the pig trap.

The carriage is extended to the extended position using the jack, jacking mechanism or elevator.

The pig is pulled from the pig trap to the carriage.

The combination of carriage and pig are then retracted to the retracted position. The housing and pig are then transported to the remote location. This procedure is reversed when transporting a pipeline pig to a pig trap.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 7 is a fragmentary perspective view of the embodiment of FIG. 1 of the apparatus of the present invention;

FIG. 8 is a fragmentary perspective view of the embodiment of FIG. 1 of the apparatus of the present invention;

FIG. 9 is a fragmentary perspective view of the embodiment of FIG. 1 of the apparatus of the present invention;

DETAILED DESCRIPTION OF THE INVENTION

Figure 1:
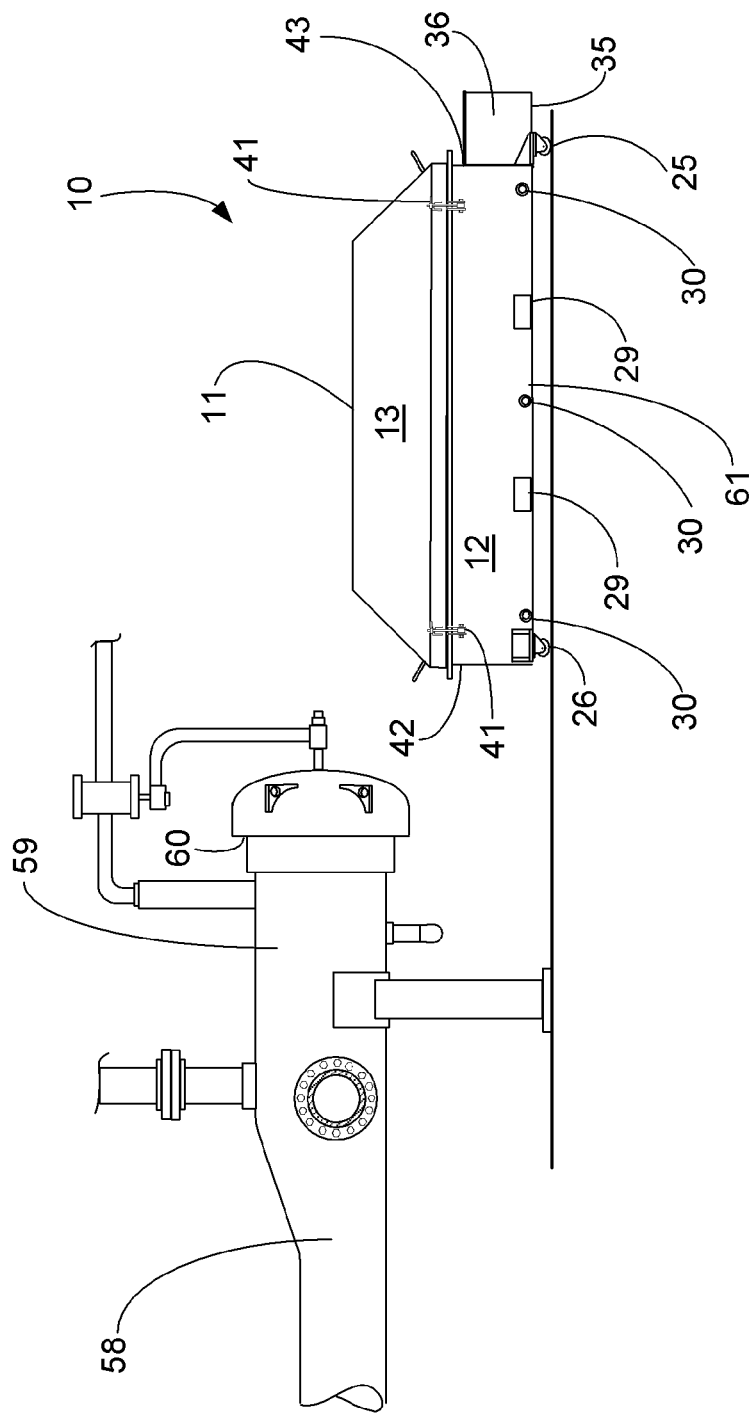
FIG. 1 is a schematic side elevation view of a preferred embodiment of the apparatus of the present invention and illustrating a method of the present invention, showing the placement of the housing next to a pig trap.
Figure 2:
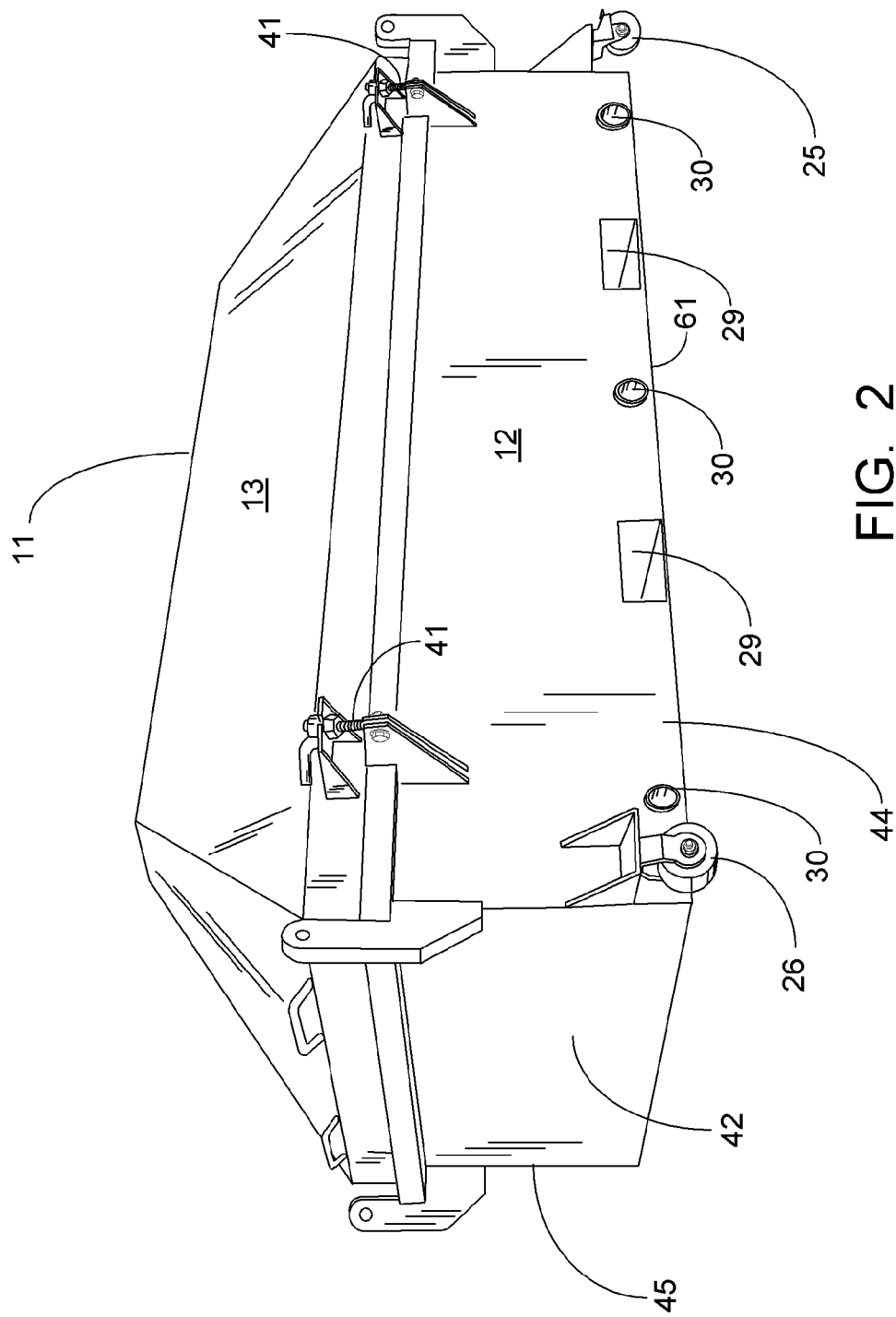
FIG. 2 is a partial perspective view of the embodiment of FIG. 1 showing the housing.
Figure 3:
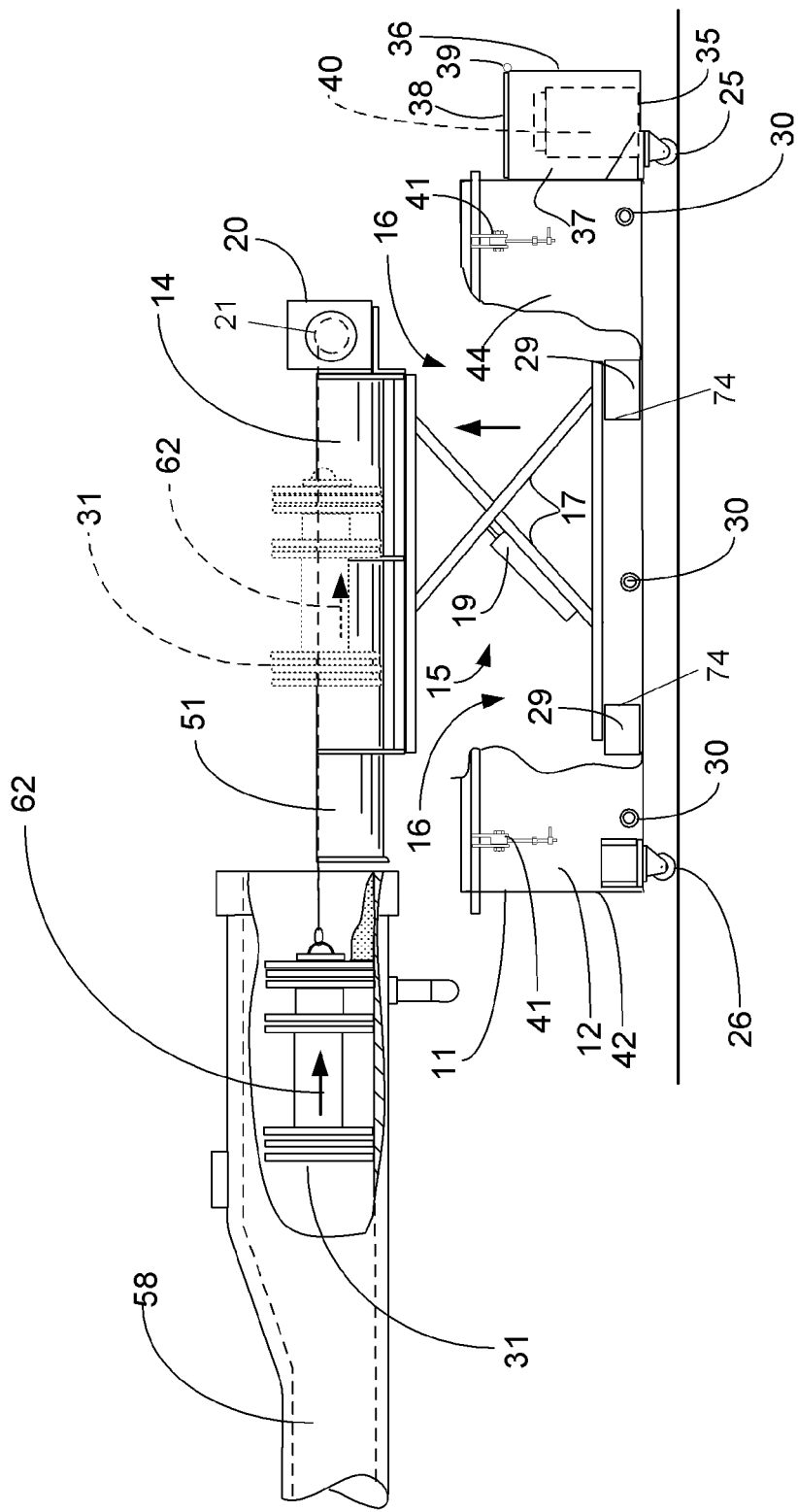
FIG. 3 is a side elevation view of the embodiment of FIG. 1 illustrating part of a method of the present invention.
Figure 4:
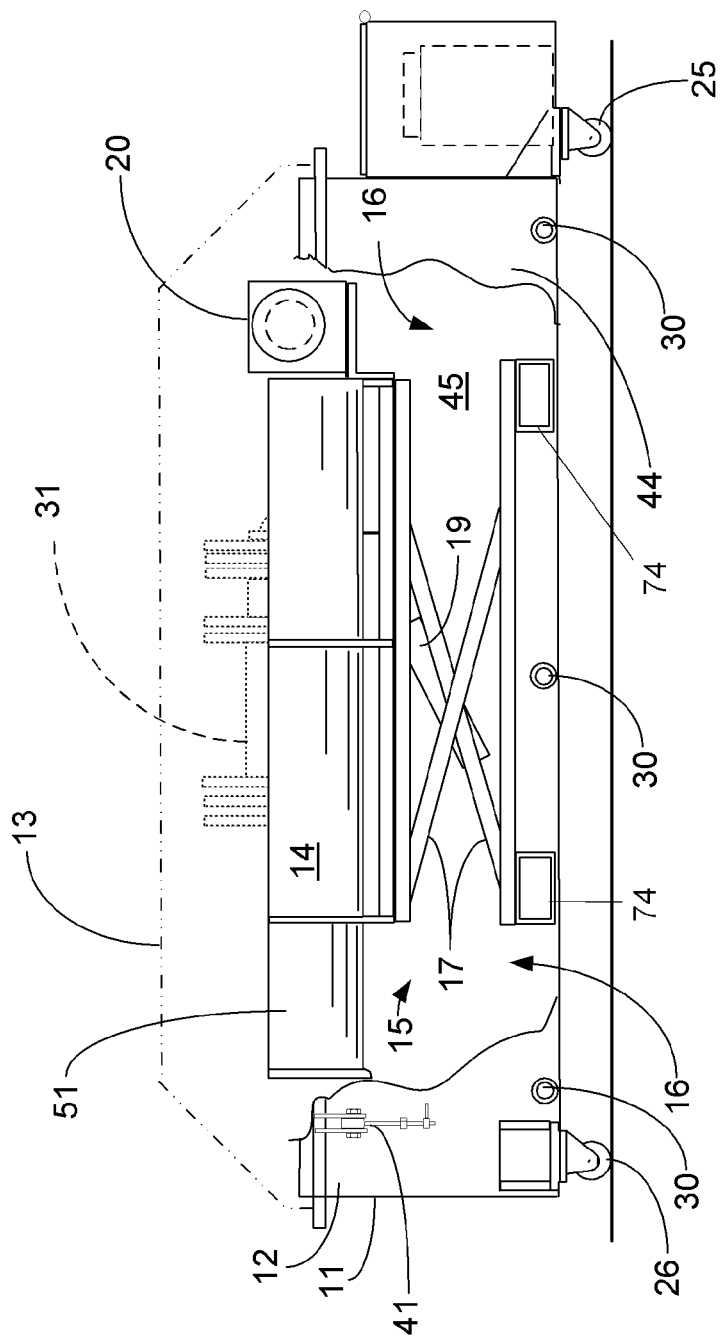
FIG. 4 is a partially cut away side view of the preferred embodiment of the apparatus of the present invention and showing part of the method of the present invention.

FIGS. 1-12 show a preferred embodiment of the apparatus of the present invention, designated generally by the numeral 10. Pig transport apparatus 10 is also shown in the drawings as part of a method of the present invention wherein a pipeline pig 31 is transferred from a pig trap 59 to a housing 11 interior 16. The pig 31 can be of various dimensions existing in the industry. The housing 11 can vary in sized based on the dimensions of the pig 31. The housing 11 can be preferably 2.5-8 feet (0.76-2.44 meters) wide, 4-18 feet (1.22-5.49 meters) long, and 2.5-6 feet (0.76-1.83 meters) high.

Pig transport apparatus 10 provides a housing 11. The housing 11 can be a two part housing having an upper section 13 and a lower section 12. The upper section 13 can be for example 1.5-5 feet (0.46-1.52 meters) high. The lower section 12 can be for example 1-3 feet (0.30-0.91 meters) high. The sections 12, 13 can be connected together and locked together using latches 41. Carriage 14 is movably supported by jack or jacking mechanism or elevator 15.

Jacking mechanism 15 can provide for example a scissors jacking mechanism 17. The scissors jacking mechanism 17 employs extensible push rod 18 and cylinder 19. Such a scissors jacking mechanism 15, 17 is commercially available from Advance Lifts® (www.advancelifts.com). Jack 15 can be for example an Advance Lift hydraulic lift table model no. P 2536.

A pulling device 20 is mounted on housing 11 or carriage 14. Pulling device 20 enables a pipeline pig 31 to be pulled from pig trap 59 to the concave surface 50 of curved plate (pig trough) 51 of carriage 14. The carriage 14 can be can be preferably 2-5 feet (0.61-1.52 meters) wide, 4-16 feet (1.22-4.88 meters) long, and 2-4 feet (0.61-1.22 meters) high. Pulling device 20 can be for example a winch having drum 21 and motor or motor drive 22 (see FIGS. 3-6). Pulling device 20 can for example be a pneumatic winch such as JEAMAR model no. U8-A-15 sold by Jeamar Winches, Inc. (www.jeamar.com).

Cable 23 is wound upon drum 21. Cable 23 can provide a hook 34 or other implement for forming a connection with bar 64 on pig 31 at end portion or nose 32.

Winch 20 can be provided with pneumatic hoses 24 for controlling the operation of winch 20. Winch 20 can also be provided with a remote control valve plus hose (e.g. 10 foot (3.05 meters)) that enables operation of all of the winch functions from a distance.

Housing 11 is preferably wheeled, providing a plurality of casters 25, 26. Casters 25 are preferably swivel type (see FIG. 7). Jack 15 provides a platform 27 having upper surface 28 that cradles or supports carriage 14. Housing 11 also provides a pair of spaced apart channel beams 74 that are hollowed to provide forklift tine sockets 29. Housing 11 has drain openings 30. When a pig 31 is transferred to housing 11, it can typically be contaminated with wax, dirt, residue from the pipeline all draining into housing 11. The drain openings 30 can be closed (with 2-inch (5.08 cm) plugs, for example) until it is necessary to clean the interior 16 of housing 11 to remove such contaminants.

On the interior of walls 44, 45 there are preferably two collars 65, 66 (see FIGS. 11 and 12) on the inner ends (on each side). These collars 65, 66 can support wind/splash guards, such as framed tarps 67, 68 for use in windy conditions to prevent liquid from being blown over or away from the sides or walls 44, 45 of housing 11. The framed tarps 67, 68 can be, for example, a rectangular frame about 4 feet (1.22 meters) high, but not as long as housing 11 (in order to not interfere with access to the pig trap door). The framed tarps 67, 68 will preferably extend into the housing 11 a sufficient distance that liquid cannot blow out through the gap between the frame and housing 11 (for example, about an inch). The collars or sockets 65, 66 can be spaced for example about six inches (15.24 cm) from the ends 42, 43 except for the one near the control 40 for the winch 20. That collar 66 (on the left in FIG. 11) is preferably spaced further away (such as about 16 inches (40.64 cm) away, as indicated by the two arrows 75 in FIG. 11) from the end 43 (to allow room for the winch and scissor controls 40 to exit the container 36). Each framed tarp 67, 68 can employ a rectangular frame 69 or 70 to which a tarp or fabric or other sheet of material 71, 72 can be attached using fasteners 73 (e.g. cable ties, straps, cables, ropes or the like), with male pins extending downwardly and received in female sockets 65, 66.

Housing 11 can provide a shelf 35 that is mounted to support walled enclosure 36. The walled enclosure 36 can be preferably 2-6 feet (0.61-1.83 meters) wide, 1-5 feet (0.30-1.52 meters) long, and 1-4 feet (0.30-1.22 meters) high. The walled enclosure 36 provides an interior 37 for holding hydraulic control 40 that operates jack 15. Cover 38 can be connected to walled enclosure 36 with hinge 39. Hydraulic control 40 is commercially available.

Housing 11 can thus provide end walls 42, 43 and side walls 44, 45. These walls 42, 43, 44, 45 combined with a bottom panel or plate 61 define a reservoir for catching and holding any waste material that falls from pig 31 during use.

The pig 31 can be any commercially available pig or any other pig that can be used to clean a pipeline 58. Typically, a pig 31 has a pig body 46. The pig body 46 can in some cases be steel, iron, or other metal material. The pig body 46 can support any number of implements such as a disk or disks, cup or cups, scrapers, brushes or the like 47. Such pigs 31 are well known in the art and are commercially available.

Pig 31 provides end or nose 32 that is receptive of hook 34 at recessed rod 64. The pig 31 provides leading end 48 which can be the same as end portion 32. The pig 31 also provides trailing end 49.

Carriage 14 employs curved plate 51 which is supported by a plurality of vertical supports 53, 54, 55. Each of the vertical supports 53, 54, 55 is thus generally u-shaped, conforming to the surface of curved plate 51. The curved plate 51 can be generally in the form of half of a cylinder as shown. The vertical supports 53, 54, 55 can be further supported with a plurality of longitudinally extending plates 56 that are connected to the vertical supports 53, 54, 55 (for example, welded). Base plate 57 is also provided as a part of carriage 14. Base plate 57 defines a bottom of carriage 14. Each of the vertical supports 53, 54, 55 could be connected to the base plate 57 using welding for example. Each of the longitudinally extending plates 56 could also be attached to the base plate 57 using welding.

Figure 5:
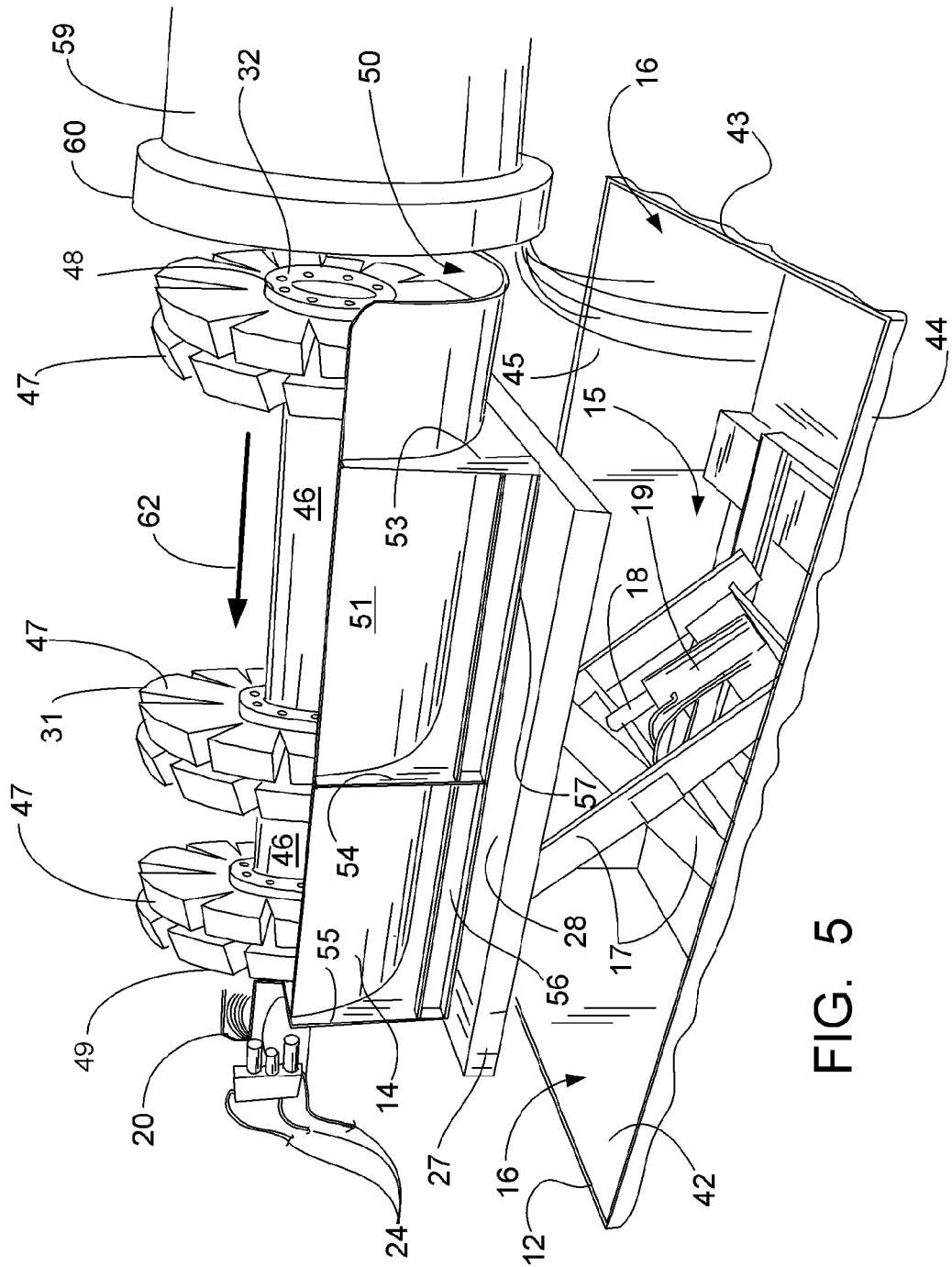
FIG. 5 is a partially cut away side view of the embodiment of FIG. 1 and showing part of a method of the present invention.
Figure 6:
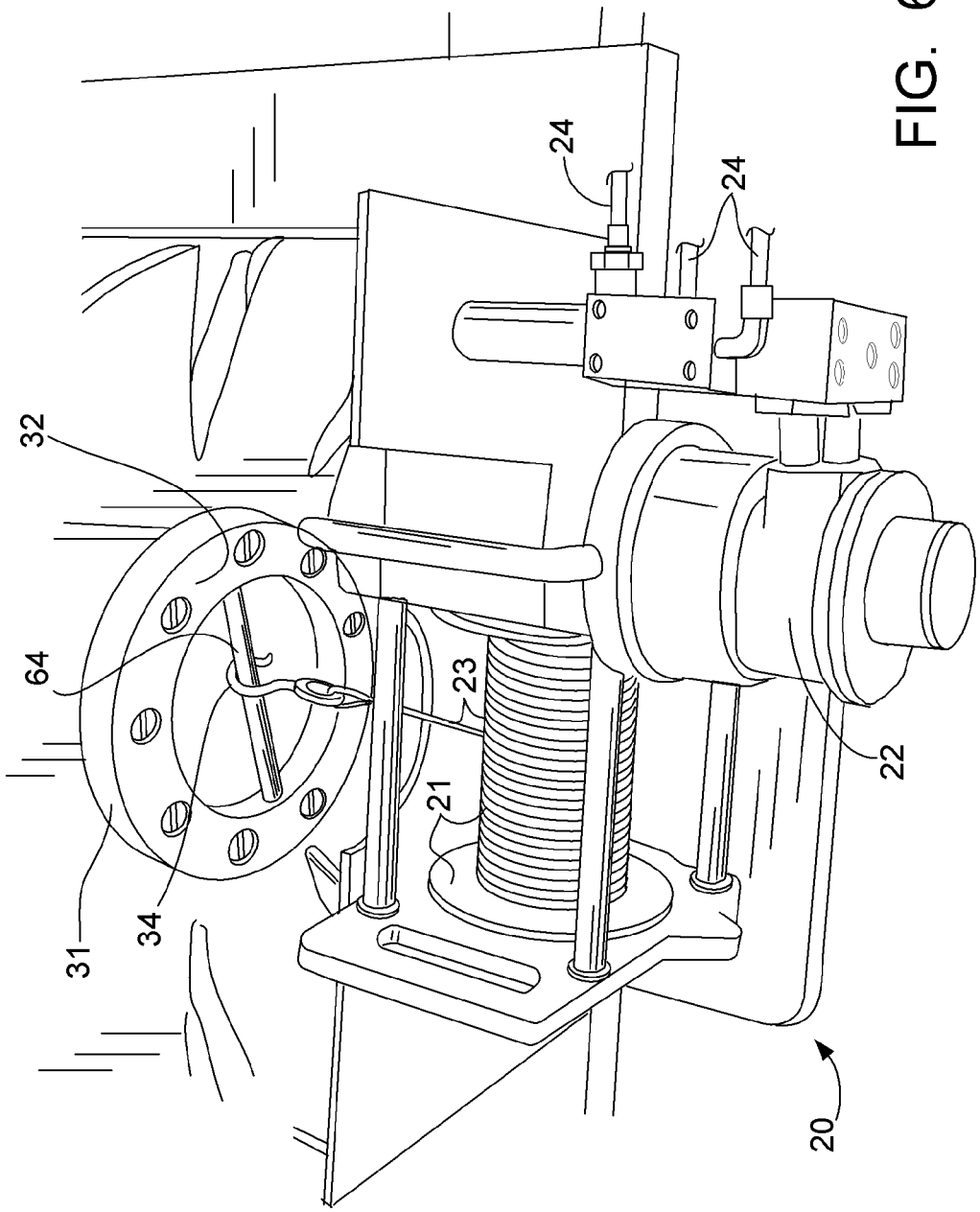
FIG. 6 is a fragmentary perspective view of the embodiment of FIG. 1 of the apparatus of the present invention.

In FIGS. 1 and 5, pig trap 59 is shown having an entry 60. Such pig traps 59 are known. As part of a method of the present invention, a pipeline pig 31 is transferred from a pig trap 59 to a remote location that is spaced away from the pig trap 59 (or from the remote location to pig trap 59). The method includes providing housing 11 having an interior 16 that contains a jack or jacking mechanism or elevator 15. The jack or jacking mechanism or elevator 15 moves between an extended and a retracted position. In the retracted position, the jack 15 is fully collapsed within the interior 16 of housing 11 (see FIG. 4). Jack 15 provides a support for carriage 14 and moves the carriage 14 between the extended position and the retracted position. When in the extended position, the carriage is positioned to receive a pig that is moved from the pig trap 59 to the carriage 14 (see FIGS. 3 and 5). When the carriage 14 is moved to the extended position, the pulling device 20 pulls the pig 31 from the pig trap 59 to the carriage 14 concave surface 50 (see arrow 62, FIGS. 3 and 5) by attaching hook 34 to bar 64 recessed in the nose 32 of pig 31 and pulling with cable 23. Once the pig 31 is supported by the carriage 14, the jack 15 moves the carriage 14 to the retracted position of FIG. 4.

The pig 31 that has been removed from pig trap 59 would typically be carrying waste material that is removed from the pipeline 58 as part of pipeline cleaning operations. Thus, the pig 31 and its waste material is pulled into the housing 11 interior 16, thus preventing any escape of waste material or hazardous material from the pig 31 to the surrounding environment. The housing 11 would thus preferably provide an upper section 13 that could be joined to the lower section 12 for closing or sealing the pig within the interior 16 of housing 11. After removal of pig 31 from pig trap 59, the combination of pig 31 and housing 11 can then be transported to a selected remote location such as a cleaning facility, repair facility, etc. The housing 11 is transported to a remote location using a vehicle for example. A forklift can be used to transport the housing 11 and contained pig 31 from a position next to the pig trap 59 to a position on a vehicle such as a truck or trailer. The forklift tines engage sockets 29 so that the forklift can lift and transfer housing 11 to a selected vehicle.

Pig 31 has a connector/chain/fitting 33 which can be used to hoist the pig 31 when it is being cleaned or stored.

Figure 10:
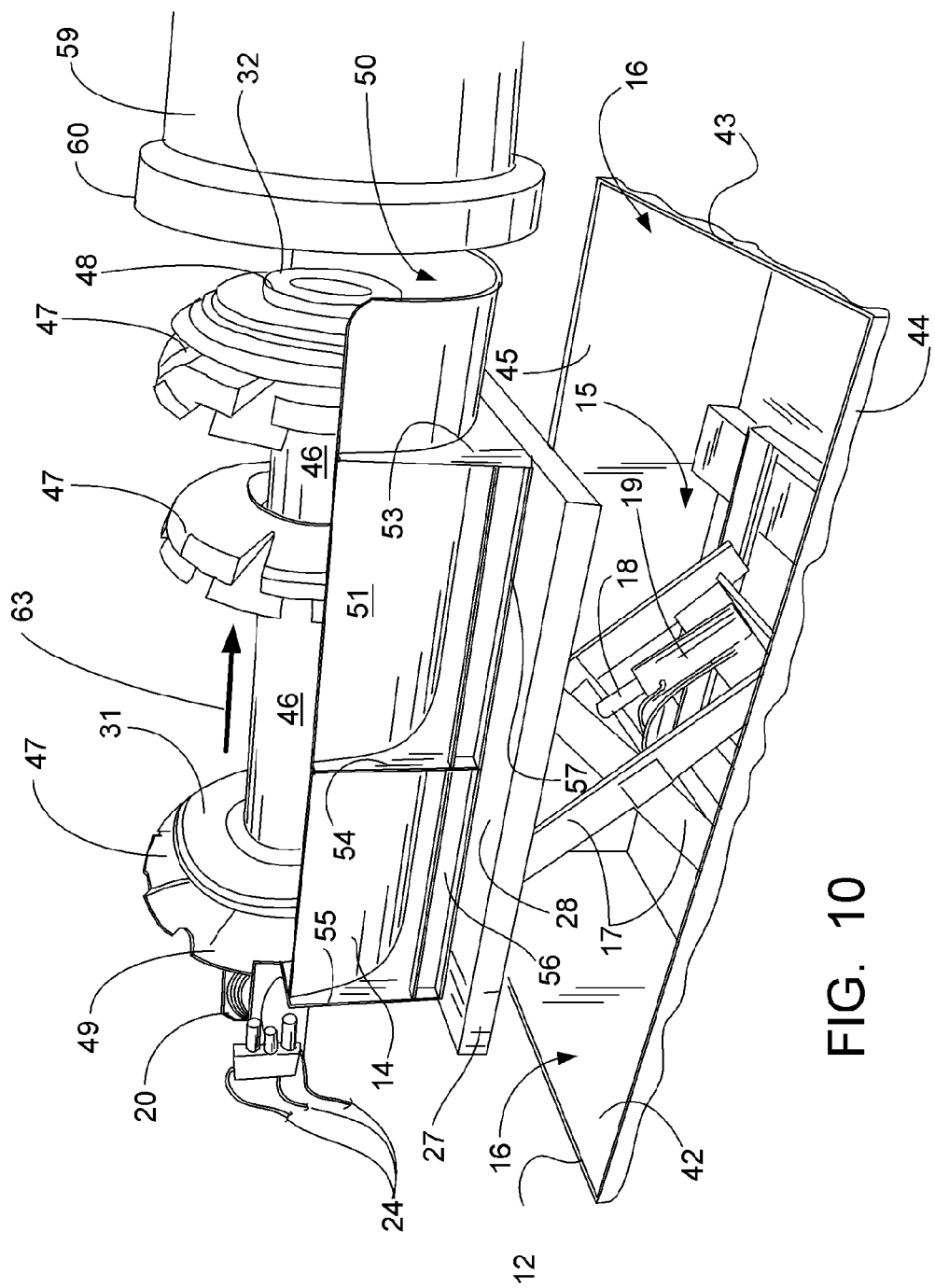
FIG. 10 is a partially cut away side view of the embodiment of FIG. 1 and showing part of a method of the present invention.
Figure 11:
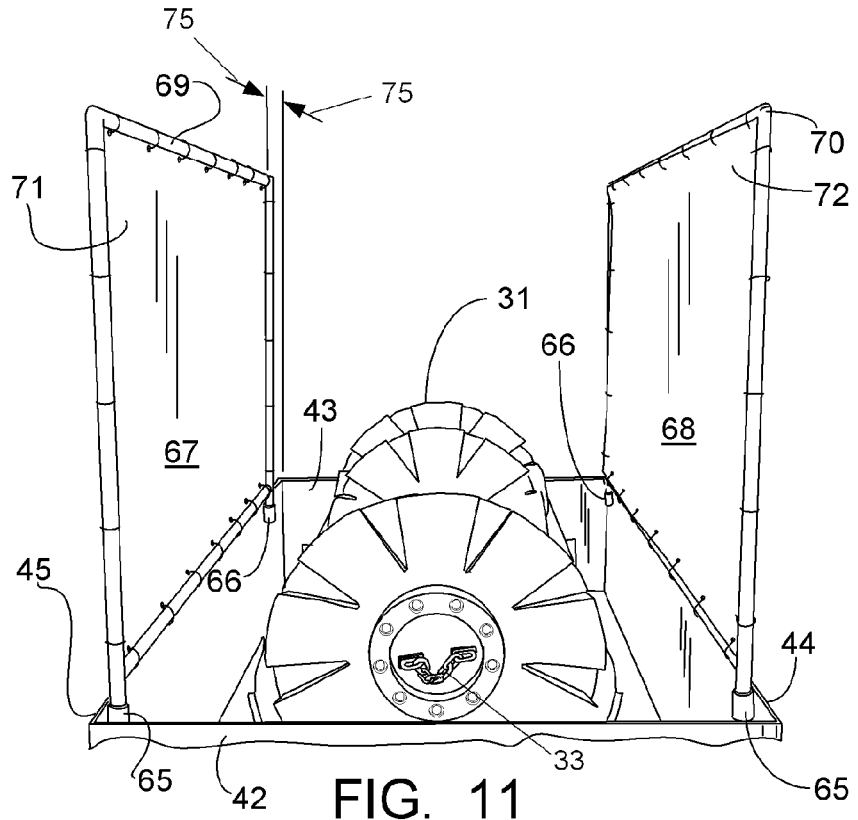
FIG. 11 fragmentary perspective end view of the embodiment of FIG. 1 of the apparatus of the present invention showing an optional wind guard.
Figure 12:
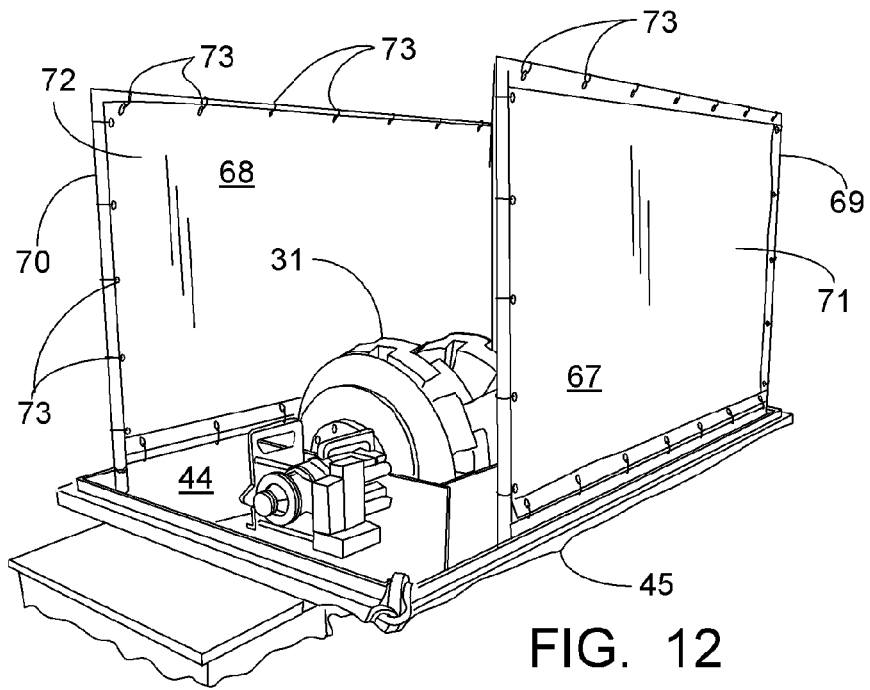
FIG. 12 fragmentary perspective view of the embodiment of FIG. 1 of the apparatus of the present invention showing an optional wind guard.

FIG. 10 shows the apparatus of the present invention in place to insert the pig 31 into the pipeline pig trap 59. In FIG. 10, elevator 15 has lifted pig trough 14 up to a level where it is approximately at the same level as trap 59 so pig 31 can be pushed into trap 59 (manually, for example, or with any appropriate pushing device, such as a forklift) in the direction of arrow 63.

Other lifting mechanisms or elevators which can be used instead of jacking mechanism 15 shown in the drawings include a pallet jack, an air-bag lift, and an overhead chain hoist/fall.

Housing 11 is preferably made of aluminum due to its light weight and durability, though other materials, such as carbon steel, stainless steel, or fiberglass, could be used instead for all or part of housing 11.

Housing 11 can be, for example, around 5 feet (1.52 meters) wide by around 8 feet (2.44 meters) long by around 4 feet (1.22 meters) high, when a pig to be pulled and transported is around 24 inches (60.96 cm) in diameter and around five feet (1.52 meters) long. Other suitable dimensions for pipeline pigs of other sizes are around 3-6 feet (0.91-1.83 meters) wide by around 3-30 feet (0.91-9.14 meters) long by around 3-6 feet (0.91-1.83 meters) high.

The following is a list of parts and materials suitable for use in the present invention.

| PARTS LIST | |
| --- | --- |
| Part Number | Description |
| 10 | pig transport apparatus |
| 11 | housing |
| 12 | lower section |
| 13 | upper section |
| 14 | carriage |
| 15 | jack/jacking mechanism/elevator |
| 16 | interior |
| 17 | scissors jacking mechanism |
| 18 | pushrod |
| 19 | cylinder |
| 20 | winch/pulling device |
| 21 | drum |
| 22 | motor/motor drive |
| 23 | cable |
| 24 | hoses |
| 25 | caster |
| 26 | caster |
| 27 | platform |
| 28 | upper surface |
| 29 | forklift socket |
| 30 | drain |
| 31 | pig |
| 32 | nose or end portion |
| 33 | connector/chain/fitting |
| 34 | hook |
| 35 | shelf |
| 36 | walled enclosure |
| 37 | interior |
| 38 | cover |
| 39 | hinge |
| 40 | hydraulic control |
| 41 | latch |
| 42 | end wall |
| 43 | end wall |
| 44 | side wall |
| 45 | side wall |
| 46 | pig body |
| 47 | disk, cup, scraper |
| 48 | leading end |
| 49 | trailing end |
| 50 | concave surface |
| 51 | curved plate |
| 53 | vertical support |
| 54 | vertical support |
| 55 | vertical support |
| 56 | longitudinal plate |
| 57 | base plate |
| 58 | pipeline |
| 59 | pig trap |
| 60 | entry |
| 61 | bottom wall |
| 62 | arrow |
| 63 | arrow |
| 64 | pull bar in nose 32 of pig 31 |
| 65 | collar/socket |
| 66 | collar/socket |
| 67 | framed tarp |
| 68 | framed tarp |

| PARTS LIST | |
| --- | --- |
| Part Number | Description |
| 69 | frame |
| 70 | frame |
| 71 | sheet of material |
| 72 | sheet of material |
| 73 | fastener |
| 74 | beam |
| 75 | arrow |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A pipeline pig transport apparatus comprising:
 a) a housing having an interior and side walls capable of holding any fluids spilled within the interior;
 b) a jacking mechanism contained within the housing interior; and
 c) a carriage that is supported by the jacking mechanism for movement between upper extended and lower retracted positions, the carriage having a concave surface that generally cradles a pipeline pig to be transported; and
 d) wherein in the extended position, the concave surface is positioned above the housing side walls.

2. A pipeline pig transport apparatus comprising:
 a) a housing having a lower section, an upper section, and an interior;
 b) a pulling device on the housing that enables a pipeline pig to be pulled from a location that is not in the housing to a location in the housing;
 c) a lifting mechanism contained within the interior housing;
 d) a carriage that is supported by the lifting mechanism for movement between upper extended and lower retracted positions, the carriage having a surface that is shaped to generally cradle a pipeline pig to be transported; and
 e) plugs that seal the lower section to make it fluid tight.

3. A pipeline pig transport apparatus comprising:
 a) a housing having a lower section, an upper section, and an interior;
 b) a pulling device on the housing that enables a pipeline pig to be pulled from a location that is not in the housing to a location in the housing;
 c) a lifting mechanism contained within the interior housing;
 d) a carriage that is supported by the lifting mechanism for movement between upper extended and lower retracted positions, the carriage having a surface that is shaped to generally cradle a pipeline pig to be transported ; and
 e) wherein the housing provides a walled reservoir that enables containment of fluid material.

4. The pipeline pig transport apparatus of claim 3 wherein the carriage has an open end portion that enables intake of the pipeline pig along a generally linear path.

5. The pipeline pig transport apparatus of claim 3 wherein the carriage has an open end portion that enables intake of the pipeline pig along a generally horizontal path.

6. The pipeline pig transport apparatus of claim 3 wherein the carriage has an open end portion that enables loading of the pipeline pig to the carriage by sliding the pig using the pulling device.

7. The pipeline pig transport apparatus of claim 3 wherein the carriage occupies the lower section of the housing in the lower, retracted position.

8. The pipeline pig transport apparatus of claim 3 wherein the housing is wheeled.

9. The pipeline pig transport apparatus of claim 3, further comprising a remote control for the pulling device.

10. The pipeline pig transport apparatus of claim 3, further comprising a wind guard which extends along a side of the housing.

11. A pipeline pig transport apparatus comprising:
a) a housing having a lower section, an upper section, and an interior;
b) a pulling device on the housing that enables a pipeline pig to be pulled from a location that is not in the housing to a location in the housing;
c) a lifting mechanism contained within the interior housing;
d) a carriage that is supported by the lifting mechanism for movement between upper extended and lower retracted positions, the carriage having a surface that is shaped to generally cradle a pipeline pig to be transported; and
e) wherein latches operably connect the lower section and the upper section.

12. The pipeline pig transport apparatus of claim 11, further comprising a remote control for the pulling device.

13. A pipeline pig transport apparatus comprising:
a) a housing having a lower section, an upper section, and an interior;
b) a pulling device on the housing that enables a pipeline pig to be pulled from a location that is not in the housing to a location in the housing;
c) a lifting mechanism contained within the interior housing;
d) a carriage that is supported by the lifting mechanism for movement between upper extended and lower retracted positions, the carriage having a surface that is shaped to generally cradle a pipeline pig to be transported; and
e) wherein the housing has spaced apart fork lift tine receptacles.

14. The pipeline pig transport apparatus of claim 13, further comprising a remote control for the pulling device.

* * * * *